(12) United States Patent
Koker et al.

(10) Patent No.: US 6,457,121 B1
(45) Date of Patent: Sep. 24, 2002

(54) METHOD AND APPARATUS FOR REORDERING DATA IN X86 ORDERING

(75) Inventors: Altug Koker, Rancho Cordova; Russell W. Dyer, El Dorado Hills, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/270,981

(22) Filed: Mar. 17, 1999

(51) Int. Cl.[7] .............................................. G06F 12/00
(52) U.S. Cl. ........................ 712/300; 345/656; 345/537
(58) Field of Search ............................... 712/16, 17, 18, 712/19, 300, 223; 709/212, 213, 216, 232, 234, 235; 710/20, 21–27, 112; 370/93–96, 229, 399, 417, 418; 345/28, 564, 566, 572, 556, 656, 667, 682, 537

(56) References Cited

U.S. PATENT DOCUMENTS

| | | | | |
|---|---|---|---|---|
| 4,745,599 A | * | 5/1988 | Raychaudhuri | 370/348 |
| 5,313,582 A | * | 5/1994 | Hendel et al. | 710/56 |
| 5,696,945 A | * | 12/1997 | Seiler | 345/509 |
| 5,781,201 A | * | 7/1998 | McCormak | 345/509 |
| 5,867,724 A | * | 2/1999 | McMahon | 712/22 |
| 5,936,640 A | * | 8/1999 | Horan | 345/501 |
| 6,049,526 A | * | 4/2000 | Radhakrishnan et al. | 370/229 |
| 6,104,415 A | * | 8/2000 | Gossett | 345/531 |
| 6,151,239 A | * | 11/2000 | Batra | 365/120 |
| 6,181,838 B1 | * | 1/2001 | Knowlton | 382/305 |
| 6,233,242 B1 | * | 5/2001 | Mayer et al. | 370/392 |
| 6,233,647 B1 | * | 5/2001 | Bentz et al. | 345/557 |
| 6,275,613 B1 | * | 8/2001 | Aiger | 382/195 |

* cited by examiner

Primary Examiner—Eric Coleman
(74) Attorney, Agent, or Firm—Fish & Richardson P.C.

(57) ABSTRACT

A device to change the ordering of datums in a packet from a storage device to a pre-determined ordering according to their addresses. The device has a first circuit to receive and process address information to determine a data ordering of data associated with the address information; and a second circuit to reorder the data into ordered packets in the predetermined ordering. This device can be used to efficiently transfer graphic data through the AGP bus in a computer.

25 Claims, 12 Drawing Sheets

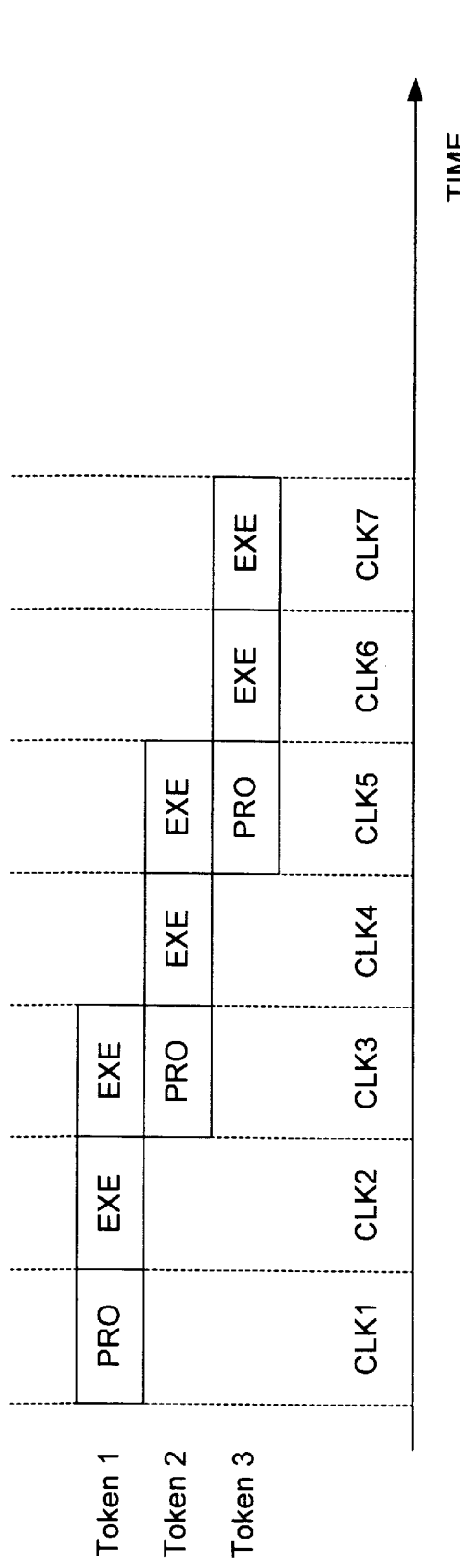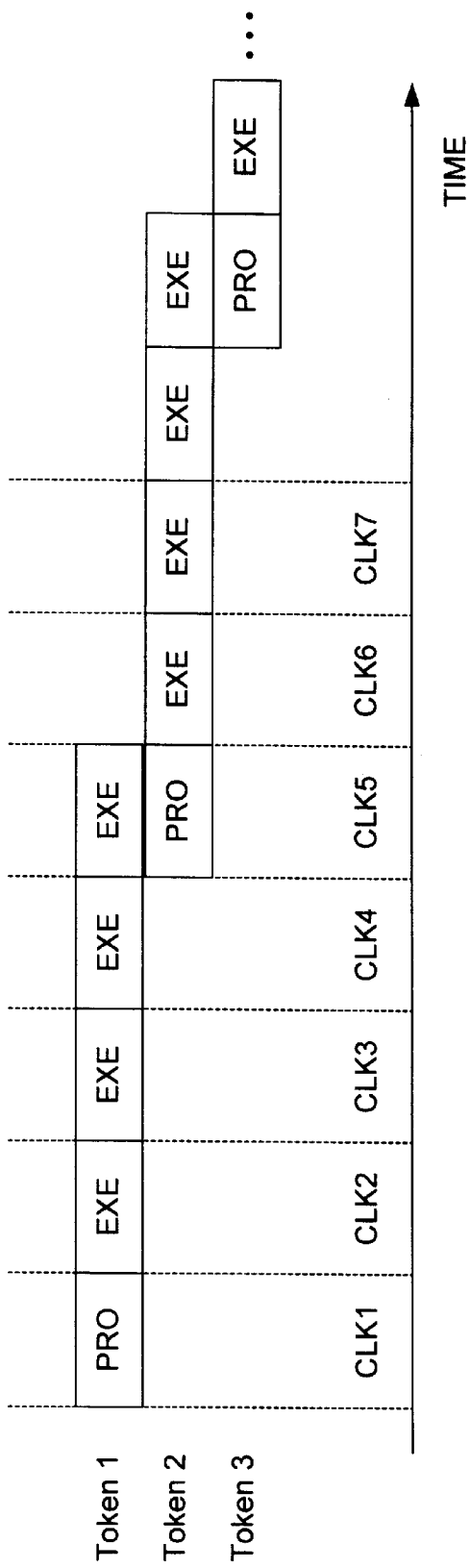

METHOD AND APPARATUS FOR REORDERING DATA IN X86 ORDERING

TECHNICAL FIELD

This invention generally relates to data communication for a processing unit in a computer, e.g., a microcomputer.

BACKGROUND

Processing of 3-dimensional graphics and video usually involves transmission and processing of a large amount of graphic data. Consumer multimedia applications such as educational software and computer games, for example, may require processing of a single 3-dimensional image in excess of 20 MB of data. Such data need be transmitted to a graphic controller having a graphic accelerator and a graphic memory from the processor, the system main memory (i.e., RAMs), or another device connected to a communication bus (such as a CD-ROM). Hence, 3D graphics and video demand a large bandwidth for data transmission and a large storage space in the system memory or graphic memory.

One standard communication bus for connecting input and output devices in personal computers is Intel□s peripheral component interconnect ("PCI") bus. FIG. 1 shows that a PCI chipset 104 is implemented as a communication hub and control for the processor 101, the main memory 106, and the PCI bus 110. The graphic controller 120 is connected as a PCI device and transfers graphic data to a display. Other types of buses can also be connected to the PCI bus 110 through another control chipset. The current PCI bus, limited in bandwidth to 132 MB/s, is often inadequate to support many graphic applications. In addition, since the PCI bus 110 is shared by the graphic controller 120 and other PCI devices 130, the actual PCI bandwidth available for graphic data is further reduced. Therefore, the PCI bus 110 forms a bottleneck for many graphic applications.

Pre-fetching graphic data to the graphic memory can alleviate the bottleneck of the PCI bus, without increasing the graphic memory (usually at about 2–4 MB). But the performance of the graphic controller may still be limited due to the sharing of the PCI bus. Another approach increases the size of the graphic memory but may not be practical for the mass PC market.

In recognition of the above limitations, Intel developed an accelerated graphic port ("AGP") designated to transmit graphic data to the graphic controller at a peak bandwidth higher than the maximum bandwidth of the current PCI bus, e.g., up to 1.066 GB/s as supported by the Fast Writes in the latest AGP specification 2.0. FIG. 2 schematically shows an AGP chipset 210 (e.g., Intel' 440LX AGPset) replacing the PCI chipset 104 in FIG. 1. The graphic controller 120 is connected through the AGP 220 rather than the PCI bus 110. The AGP 220 allows the graphic controller 120 to execute data directly from the cache, the main memory 106, or other PCI devices 130 by reducing or eliminating caching from the graphic memory. Hence, the graphic memory can remain small to reduce cost. In addition, AGP 220 reduces the data load on the PCI bus 110 and frees up the PCI bus 110 for the processor to work with other PCI devices 130.

It is desirable to further improve the efficiency in transmission and processing of data in personal computers and other systems. In AGP-based computers, for example, transmission of graphic data may be specially designed to fully utilize the high bandwidth of the AGP port.

SUMMARY

The present disclosure provides devices and associated methods for controlling data transfer from a storage device (e.g., a processor cache) to a receiving device (e.g., a graphic processor) in a predetermined ordering. Such predetermined ordering can be used to improve the efficiency of data transmission from the storage device to the receiving device.

One embodiment of the device includes a first circuit to receive data and associated address information from the storage device and a second circuit to reorder the data into ordered packets each in the predetermined ordering. The first circuit is configured to process the address information to determine a data ordering of the received data according to their addresses in the storage device. This data ordering is fed to the second circuit which accordingly performs the reordering operation.

The first and second circuits may be pipelined through a queue circuit to improve the efficiency of the reordering operation. The queue circuit may include a token queue and a data queue that respectively receive and store the tokens and the data from the first circuit.

One of applications of the disclosed devices and methods is to improve the data transfer from a processor to a graphic controller such as AGP-based personal computers.

BRIEF DESCRIPTION OF THE DRAWINGS

FIGS. 6A and 6B show pipelined processing (PRO) and execution (EXE) cycles for the reordering stage in FIG. 4 under AGP 4X and 2X modes, respectively.

DETAILED DESCRIPTION

Figure 1:
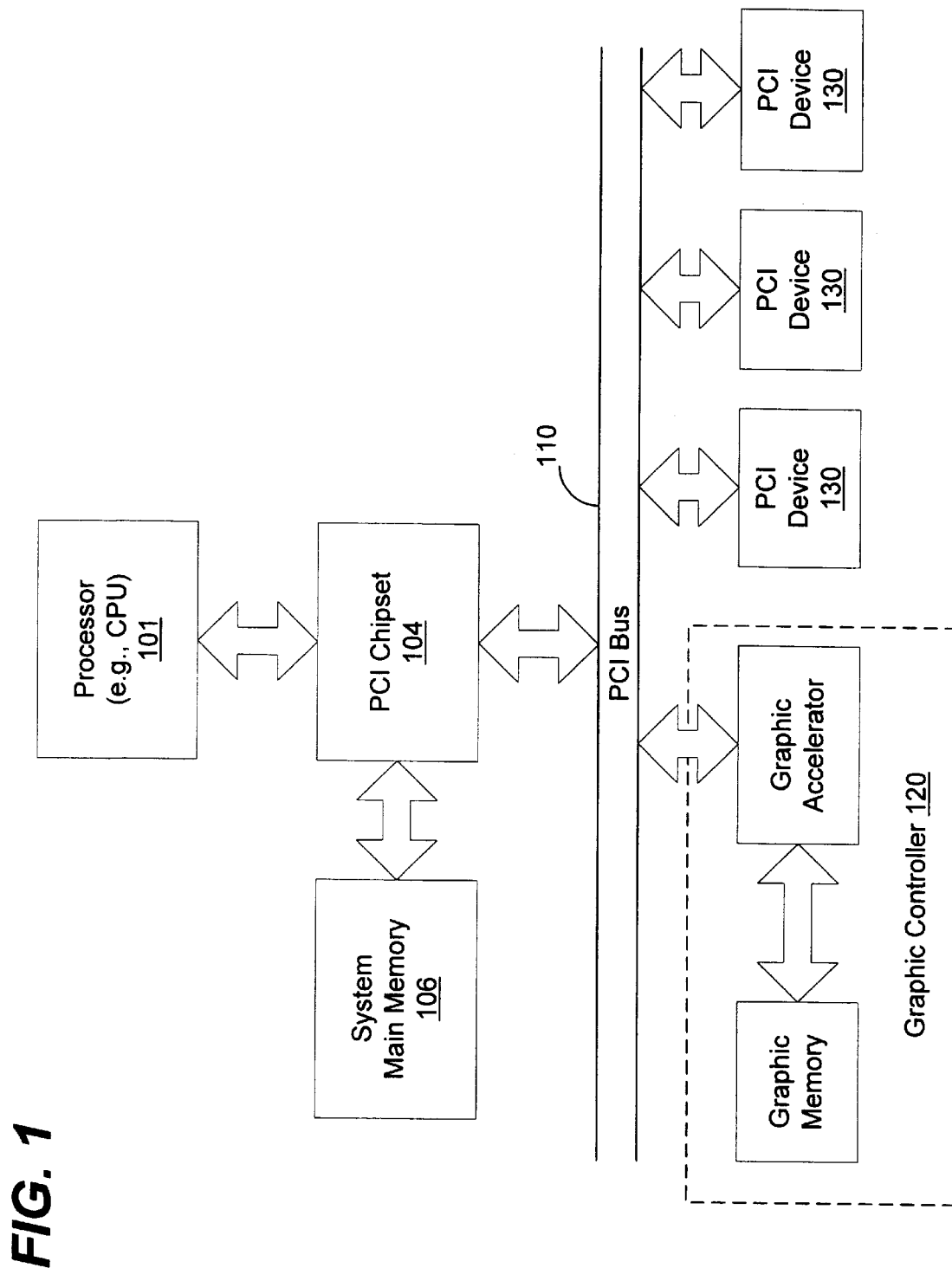
FIGS. 1 and 2 are block diagrams respectively showing computer systems based on the PCI architecture and AGP architecture using an accelerated graphic port ("AGP").

The present disclosure is based in part on the recognition that data output from the processor cache in a processor is often executed in separate data units in a sequence that may vary with different operations or devices to improve the processing efficiency. In many microprocessors such as current commercial Intel or Intel-compatible microprocessors, for example, a data unit in the output of the processor cache is a quad word of 8 bytes (hereinafter "qwords" and the cache line of the processor is 32 bytes in size. The data output from the processor cache is executed in four separate quad words. One feature of certain processors, including Intel or Intel compatible microprocessors, is "x86 ordering" on the cache line of the processor cache. In the x86 ordering, the four qwords may be transferred out of their linear address ordering in the processor cache. The x86 ordering allows a qword to be transferred in advance in order to increase the processing speed of a requesting device. In general, each qword may be transferred along with its address information in order to be properly identified. Transfer of such address information may reduce the actual speeds of data transfer to certain devices such as the graphic controller via the AGP bus.

Many processors implement a processor bus having separate communication channels for data and addresses, e.g., a 32-bit address bus and a 64-bit data bus in certain Intel microprocessors. Such a processor has a cache line of 32 bytes for output. After the 32 bytes on the cache line are filled up by data from the processor, the data is transferred on the processor data bus as four separate qwords, one qword at a time. The four qwords in the cache line have addresses 0, 1, 2, and 3. These addresses respectively correspond to their sequential addresses in the processor cache. When using a linear ordering for output, the qword in the address 0 is first transferred to the processor bus. Then the qwords in the addresses 1, 2, and 3 are transferred in the following sequential order:

qword0→qword1→qword2→qword3, where "qwordm" represents the qword in the address m (m=0, 1, 2, and 3). Ordinarily, the four qwords are transferred onto the processor data bus using the linear ordering.

A controlled device in communication with the processor sometimes needs some data or instruction that is included in a qword 1, 2, or 3, i.e., one other than the first qword in the linear ordering (i.e., qword0) to initiate or perform a specific task. The x86 ordering in the Intel processors permits the processor to transfer a critical qword out of the linear ordering to increase the processing speed of a requesting device and the overall efficiency of the computer. In addition to the linear ordering, the x86 ordering supports the following three possible orderings:

qword1→qword0→qword3→qword2, qword2→qword3→qword0→qword1, qword3→qword2→qword1→qword0.

Hence, the x86 ordering allows data transfer to start with any qword in the processor cache line so as to accommodate the need of a requesting device.

Data transfer on the processor bus is efficient since the data transfer is separate from the address transfer. The four qwords of a data packet on the cache line can be continuously transferred on the processor data bus while the corresponding address information is transferred on the processor address bus. Hence, data transfer does not compete with transfer of the addresses for the transmission bandwidth of the processor bus.

Figure 2:
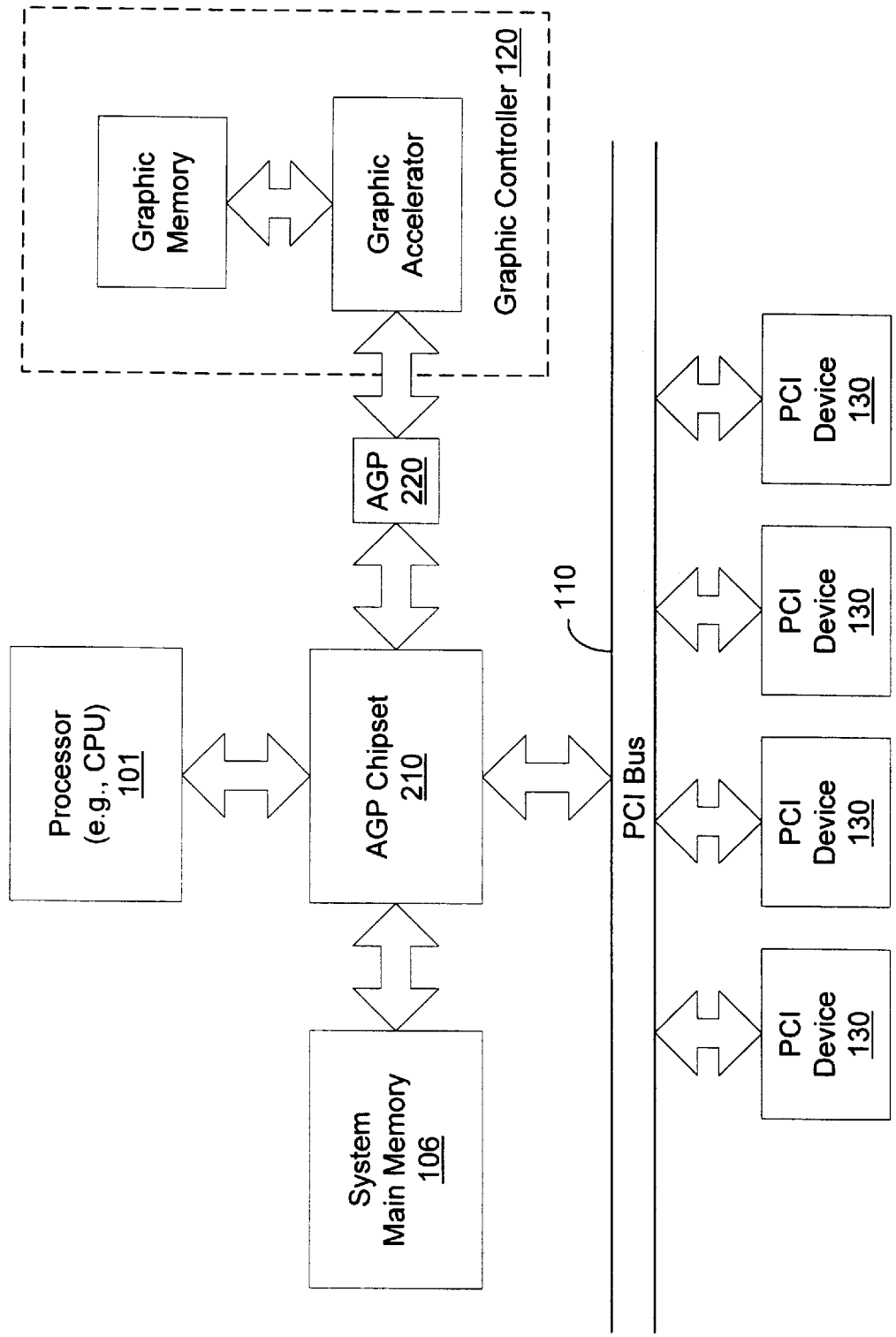

Data transfer on many other buses to controlled devices, however, often uses a single shared bus to transfer both data and respective addresses. AGP bus or PCI bus are two examples of such buses that connect controlled devices. The AGP bus in FIG. 2 may be a 32-bit bus. Therefore, transferring of addresses reduces the bus bandwidth available for transferring of the actual data.

For example, prior PCI and AGP operations used a chipset (104 or 210 in FIGS. 1 and 2) that receives and decodes the address information of a data packet from the processor bus to produce the address for each of the four qwords in the packet. The chipset then partitions the continuous transferred data in that packet from the processor data bus by inserting respective addresses. The chipset sends out the address for the first qword, and the first qword, then the second address for the second qword and the second qword and so on. Each address takes one clock cycle to transfer. On the current PCI bus, each clock cycle transfers one double word ("dword") of 4 bytes. Hence, transfer of one qword takes 2 clock cycles on the PCI bus and correspondingly requires 8 clock cycles to transfer 4 qwords. When a packet is not in the linear ordering, it takes 4 clock cycles to transfer 4 addresses of 4 qwords. Hence, a total of 12 clock cycles are needed on the PCI bus to transfer a single data packet of 4 qwords from the processor cache line. This is often not an efficient way of using the PCI bus.

The AGP provides improved transfer bandwidth over the PCI bus. Three transfer modes, 1X, 2X, and 4X modes, are supported by the AGP Specification 2.0 (Intel, May, 1998) to provide transfer speeds of 1 dword/cycle, 1 qword/cycle, and 2 qwords/cycle, respectively. Hence, it is possible to transfer 4 qwords on the processor cache line in just 2 clock cycles on the AGP bus in the 4X mode. The current AGP bus has a clock rate of 66 MHZ, twice as fast as the 33-MHZ clock rate of most PCI buses. The AGP bus attains a transfer speed of 1.066 Gbytes/s in the 4X mode.

However, the above partition of the data from the processor data bus requires an address for each qword to be transferred on the AGP bus. Hence, another 4 clock cycles are needed to transfer the addresses in addition to the 2 clock cycles for transferring 4 qwords in the 4X mode. Transferring the addresses creates overhead on the AGP bus.

Since the graphic controller shares the processor with other devices connected to the AGP chipset via the PCI bus (FIG. 2), the extra clock cycles in the partitioned data transfer on the AGP bus may cause an arbitrator circuit in the AGP chipset to assign the PCI bus to other devices while the data is being transferred from the AGP chipset to the graphic controller through the AGP. In such a case, the graphic controller waits for the PCI bus to become available again in order to receive the remaining graphic data from the processor. This can further reduce the actual data transfer speed on the AGP bus.

Hence, although the x86 ordering in the Intel processors can be beneficial in improving the processing speed of many peripheral devices and the overall operating efficiency of the system, it may actually limit the actual data transfer speed of the AGP. Hence, the x86 ordering can reduce the performance of graphic applications. This is in part because the Fast Write protocols allows the AGP to operate at the 4X mode to transfer 2 qwords in a single clock cycle while other peripheral devices on the PCI bus or other buses may need several clock cycles to transfer 1 qword from the processor cache line. As a result, the x86 ordering is becoming a bottleneck in the AGP architecture.

A data reordering mechanism is provided in some chipsets which couple the processor to the system main memory and other devices. This reordering mechanism can change the data ordering of a data packet from the processor cache into a pre-determined ordering according to their addresses in the processor cache. This predetermined ordering is maintained independent of the output ordering from the processor bus and the addresses of a received x86 ordered cycle is aligned to the address of the first data unit (e.g., qword) in the pre-determined ordering. Hence, if the address of only one of the qwords in a packet is known, the addresses of other qwords can be determined based on the ordering in the packet.

The AGP chipset or controller can be configured in such a way that x86 ordering is still available to other devices (e.g., certain PCI agents) to improve their operating efficiency.

Figure 3:
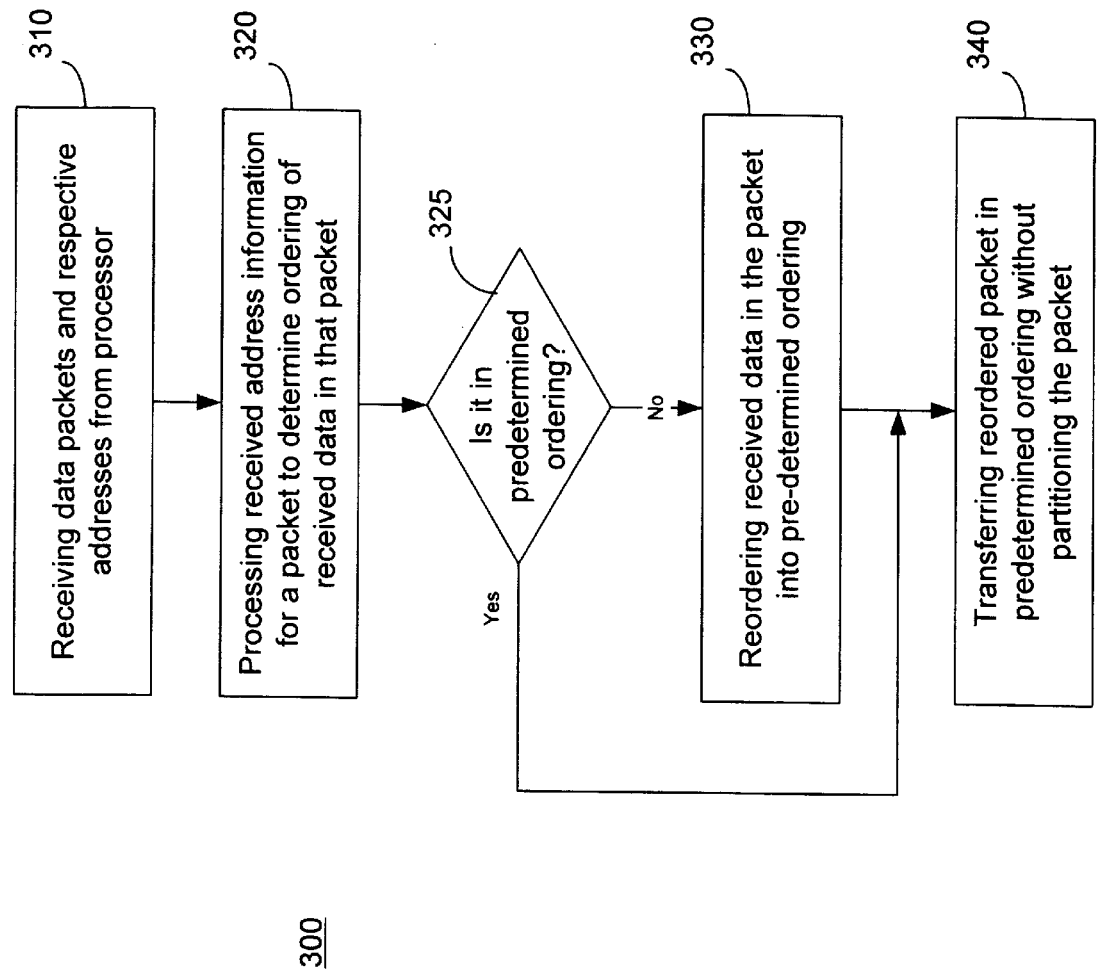
FIG. 3 is a flowchart of the reordering mechanism for the AGP chipset for the AGP architecture in accordance with one embodiment of the invention.

FIG. 3 shows a flowchart 300 of the basic operation of the reordering mechanism in the AGP chipset. At step 310, a data packet on the processor cache line and the respective addresses for the basic units in the packet are received. At step 320, the received addresses are processed to determine the received ordering of the packet. The received ordering can be any ordering, e.g., the linear ordering and three different orderings for qwords in current x86 processors. The step 325 determines if the received ordering happens to be the same as the pre-determined ordering. If so, no reordering is needed. At step 330, the received data units in the packet are rearranged into the pre-determined ordering. At step 340, the data packet in the pre-determined ordering is transferred to a selected device, without partitioning data units according to the addresses.

The following description will use the linear ordering as the pre-determined ordering to illustrate the concepts. Hence, after the reordering, the qwords are sent out of the AGP chipset in the order of qword0, qword1, qword2, and qword3 in each data packet although the qwords in each packet may have a different ordering on the processor bus.

Figure 4:
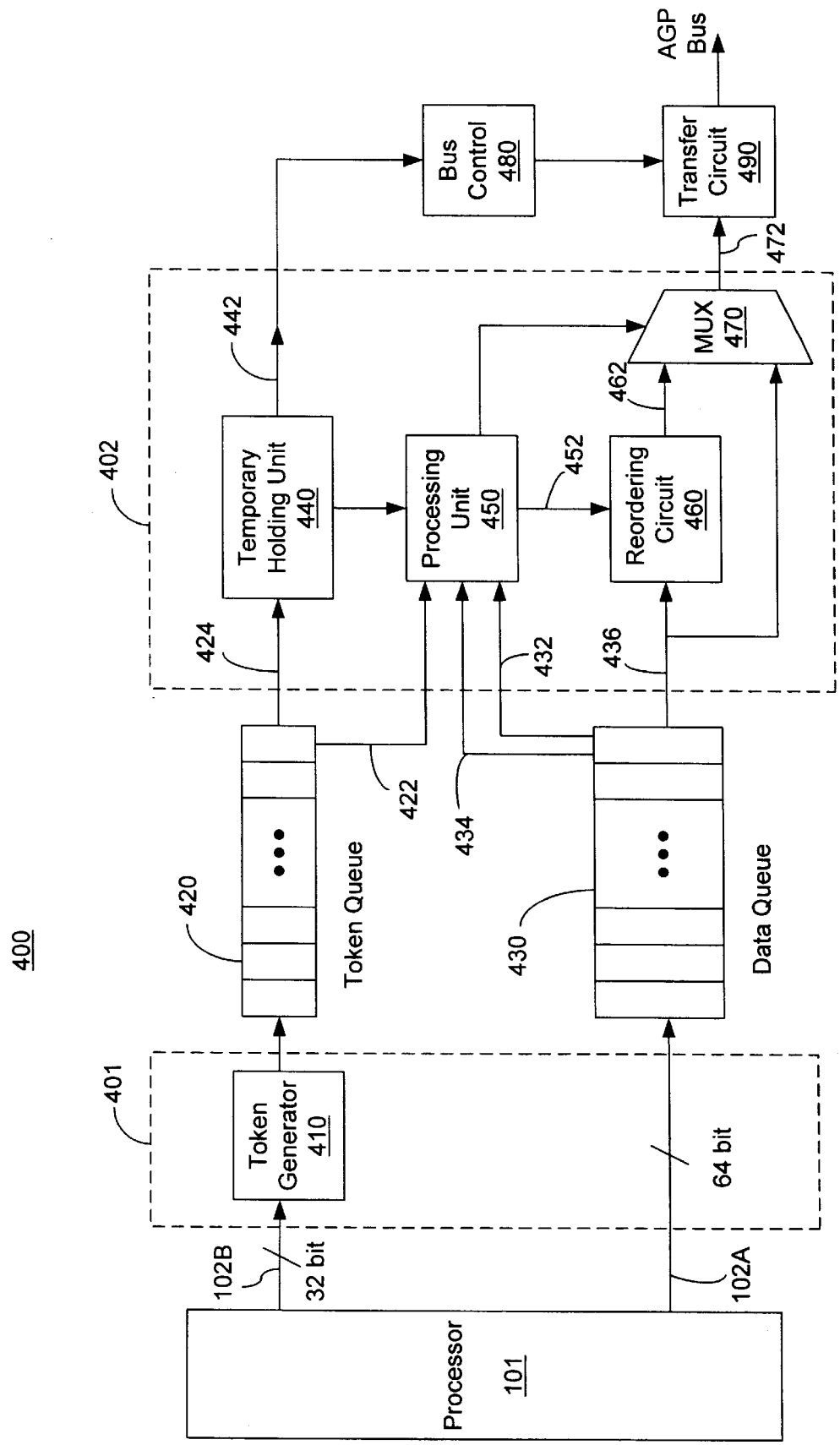
FIG. 4 shows one implementation of the reordering mechanism of FIG. 3.

FIG. 4 shows one circuit architecture 400 for implementing the reordering mechanism. A token-generating stage 401 produces tokens that include x86 ordering and address information of received data and is pipelined with a data-reordering stage 402 that processes the tokens to reorder the data into a packet in the linear ordering. The two pipelined stages 401 and 402 are separated by a queue structure having a token queue 420 and a data queue 430. The queues accumulate all data packets and associated addresses before streaming in a pipeline.

The first stage 401 includes a token generator 410 connected on the processor address bus 102B between the processor 101 and the token queue 420. The token generator 410 processes the address information from the processor 101 to obtain the x86 ordering information of the qwords within each data packet, the address of qword0 of each data packet in the processor cache, and information on the relative location of adjacent data packets in the processor cache. The above information is included in a token for each data packet and is fed to the token queue 420 for further processing in the stage 402. Qwords in the data packet are directly fed into the data queue 430 without any processing in the stage 401.

Figure 5:
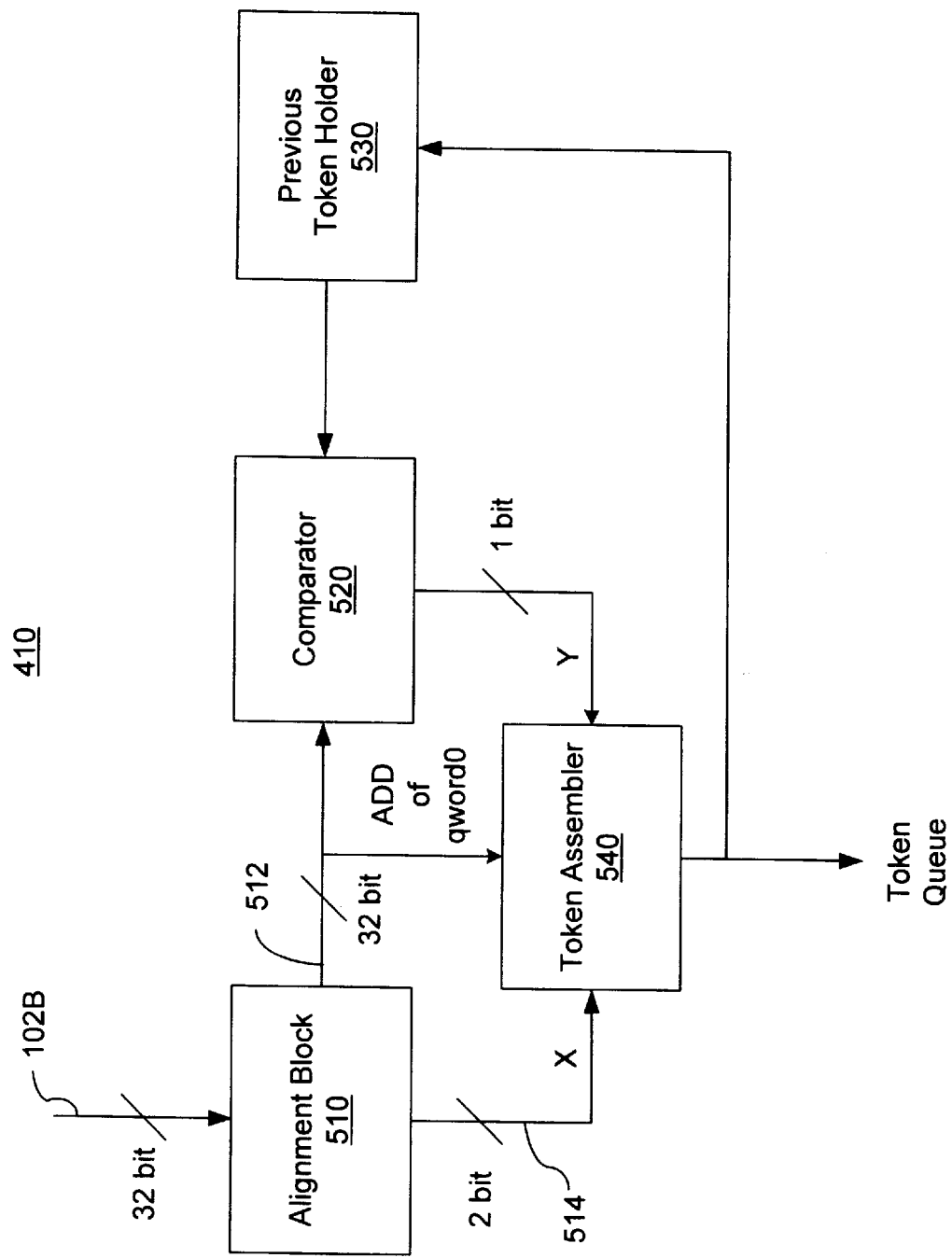
FIG. 5 shows one embodiment of the token generation circuit in FIG. 4.

FIG. 5 shows one embodiment of the token generator 410 having an alignment block 510, a comparator 520, a previous token holder 530, and a token assembler 540. Address data from the processor address bus 102B for a data packet usually includes the address of the first transferred qword and the x86 ordering information of that packet. The alignment block 510 processes this address data to produce the address of qword0 of that data packet on the output bus 512 and to produce a x86 ordering tag X on the output put bus 514. The tag X may be a 2-bit binary number to indicate the x86 ordering of the four qwords in that packet. For example, X may be equal to any one of binary numbers 00, 01, 10, and 11 which respectively represent the linear ordering, qword1→qword0→qword3→qword2, qword2→qword3→qword0→qword1, and qword3→qword2→qword1→qword0. Thus, if a received packet has a x86 ordering of qword2→qword3→qword0→qword1, the tag X is 01 and the alignment block 510 uses both the address of qword2 and the x86 ordering to determine the address for qword0.

The comparator 520 compares the address of the qword0 of the current data packet from the alignment block 510 and the address of the qword0 of the previous data packet that is temporarily held in the previous token holder 530 to determine whether the current data packet is sequential with the previous data packet in their locations within the processor cache. If the two data packets are sequential, they are appendable to each other. The comparator 520 outputs an appendablility tag Y of 1. Otherwise, the two data packets are not sequential in the processor cache and the tag Y=0. This allows AGP to transfer any number of qwords or data packets continuously, without partition by the packet address information, so long as the qwords or data packets are sequential in the processor cache. Any number of sequential qwords may be transferred through the AGP bus with only the address information of the qword0 in the first data packet and the taps.

The token assembler 540 uses the tags X, Y and the aligned address for qword0 as three fields to form a token for the data packet. This token is then sent to the token queue 420 to be processed by the stage 402.

FIG. 4 further shows a block diagram of the reordering stage 402 including a processing unit 450, a reordering unit 460, a temporary holding unit 440, and an output multiplexer 470. The temporary holding unit 440 receives the tag Y and the address for qword0 of each data packet through the bus 424 from the token queue 420. The processing unit 450 receives the x86 ordering tag X from the token queue 420 on the bus 422. The starting pointer location for four consecutive qwords in the data queue 430 on the bus 434 and the number of dwords that will be left after the current data transfer on the bus 432 are also received. The processing unit 450 generates commands 452 based on the token information to control reordering unit 460 and the output multiplexer 470 to reorder the qwords in x86 ordering into the predetermined linear ordering. If an input data packet is already in the linear ordering, the processing unit 450 controls the multiplexer 470, to let the data packet pass through the stage 402 without being reordered. The reordering can be accomplished by shifting the relative positions of individual dwords in each packet using the reordering unit 460.

The token queue 420 and the processing unit 450 are pipelined through the temporary holding unit 440. The processing unit 450 and the reordering unit 460 are pipelined through a buffer stage within the processing unit 450. The pipelining allows continuous data transfer on the AGP bus without the delay caused by the processing of the processing unit 450.

For each data packet of 4 qwords, it takes one clock cycle for the processing unit 450 to process the respective token and two clock cycles to execute the reordering and transferring the 4 qwords in that packet in the AGP 4X mode. Without pipelining to overlap the token processing and the data transfer, the AGP would not transfer data during the clock cycle when the token for a data packet is processed. This would reduce the AGP data rate, specially under the Fast Write protocols.

The pipelining between the processing unit 450 and reordering unit 460 also allows the processing unit 450 to begin processing the next token while the execution of the current token is completing. A token is first fed from the top of the token queue 420 to the processing unit 450. The token is then copied to the temporary holding unit 440 to overwrite a previous token after the token processing is completed and a new token execution begins.

FIGS. 6A and 6B show timing charts for pipelined processing and execution cycles for the reordering stage in FIG. 4 under AGP 4X and 2X modes, respectively. In the AGP 4X mode, the processing unit 450 processes the token 1(T1) at the first clock cycle(CLK1). At the second clock cycle (CLK2), the token 1 is moved to the temporary holding unit 440 and the reordering unit 460 begins to execute the token 1. At the third clock cycle(CLK3), execution of the token 1 is completing and the processing unit 450 begins processing the token 2 (T2). At the fourth clock cycle(CLK4), T2 is fed to the temporary holding unit 440 to overwrite T1 and the reordering unit begins execution of T2. Hence, an execution of data reordering and transferring is occurring at each clock cycle when the processor directly writes to the AGP.

Figure 7A:
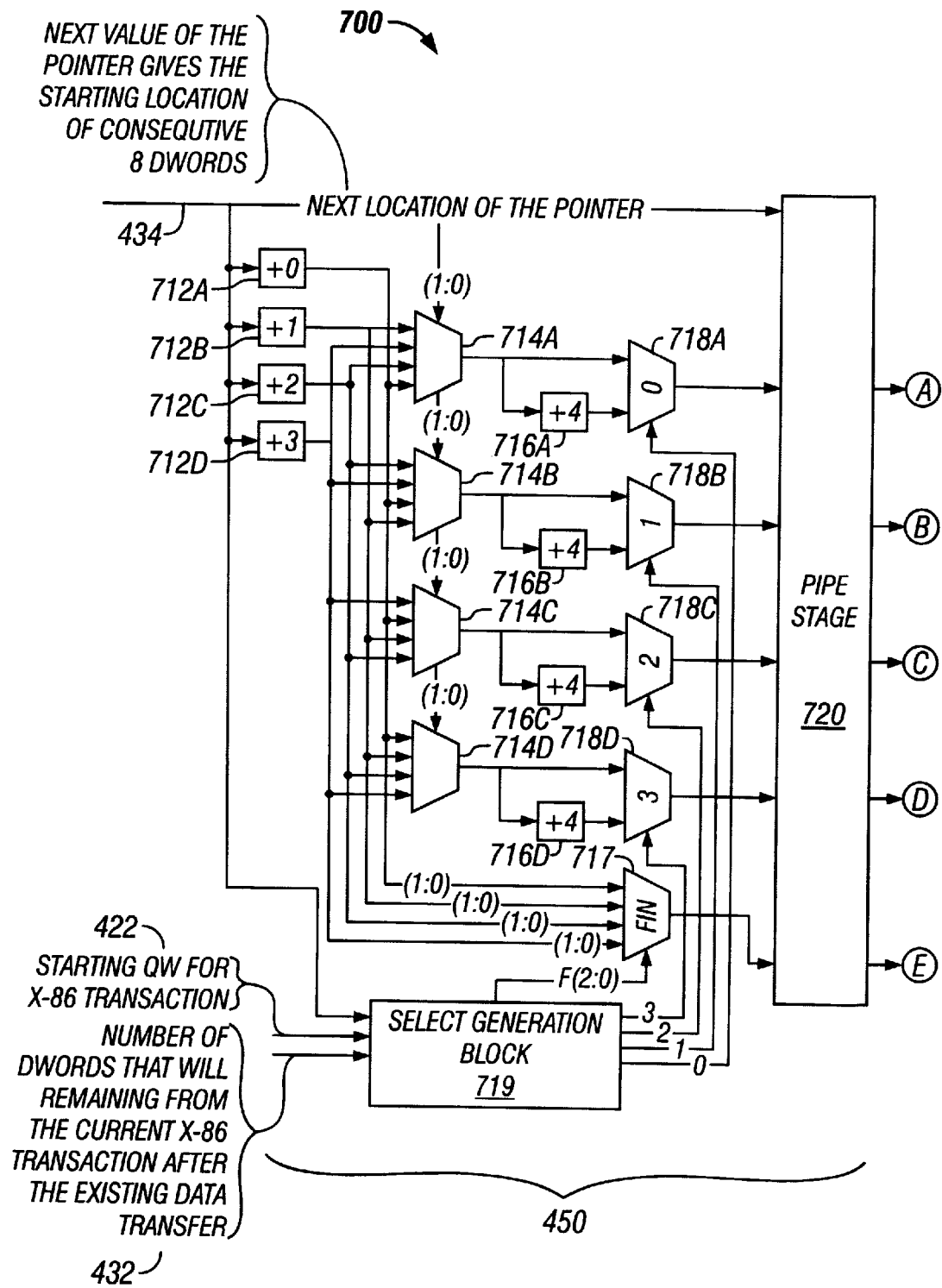
FIG. 7 shows one embodiment of the processing unit and the reordering unit shown in FIG. 4.
Figure 7B:
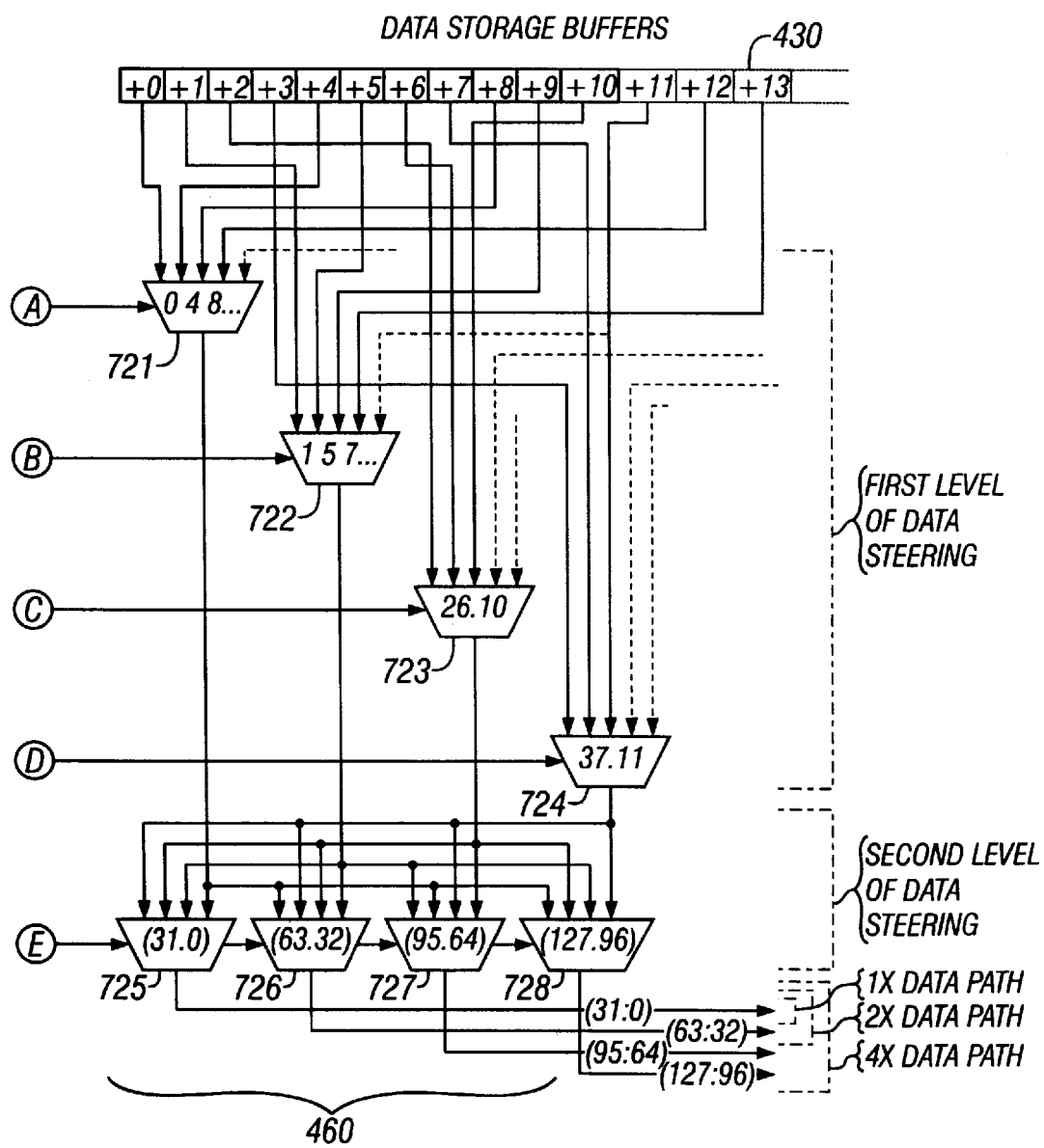

FIG. 7 shows one circuit implementation 700 of the processing unit 450 and the reordering unit 460 of FIG. 4. The circuit 700 reshuffles any consecutive eight locations, starting at any location in the data queue 430, into any desired order. The data queue 430 may be constructed with cells of 4 bytes each. Thus, a data packet from a 32-byte cache line requires 8 locations to store.

The processing unit 450 includes pointer controllers 712A through 712D that produce four consecutive pointers for four consecutive locations, four 4-input multiplexers 714A through 714D that each select one of the four pointers from the pointer controllers 712A through 712D, four pointer controllers 716A through 716D to shift a pointer by four locations, and four 2-input multiplexers 718A through 718D to produce four first-level virtual pointers. A multiplexer 717 is used to receive the four pointers from the pointer controllers 712A through 712D to produce the second-level virtual pointers. These pointers are □virtual□ because they do not represent the actual locations in the data queue 430 but represent how the locations of eight consecutive 4-byte double words should be rearranged in order to achieve the desired linear ordering based on their addresses in the processor cache. These pointers are collectively referred to as the command 452 in FIG. 4.

The virtual pointers from the circuit 450 are used to control the operation of the reordering circuit 460. A buffer stage 720 is implemented to store the virtual pointers and to pipeline the circuits 450 and 460. Specifically, the first-level virtual pointers are used to control the multiplexers 721 through 724 to select data cells in the data queue 430. The second-level virtual pointers are used to control the multiplexers 725 through 728 to reorder the selected data cells to achieve the desired linear ordering.

Figure 8A:
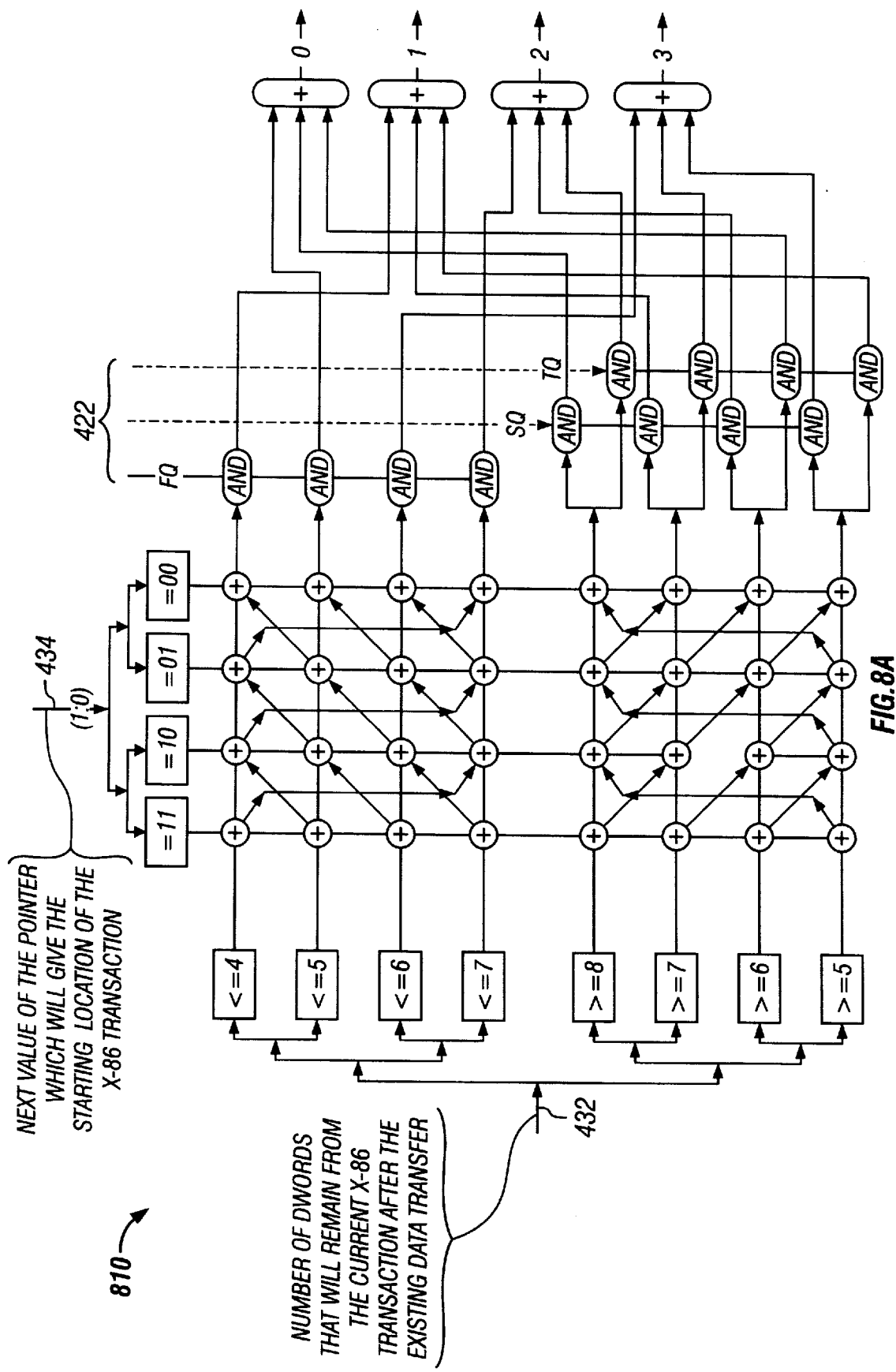
FIGS. 8A and 8B show one embodiment of the selection circuit block in FIG. 7.
Figure 8B:
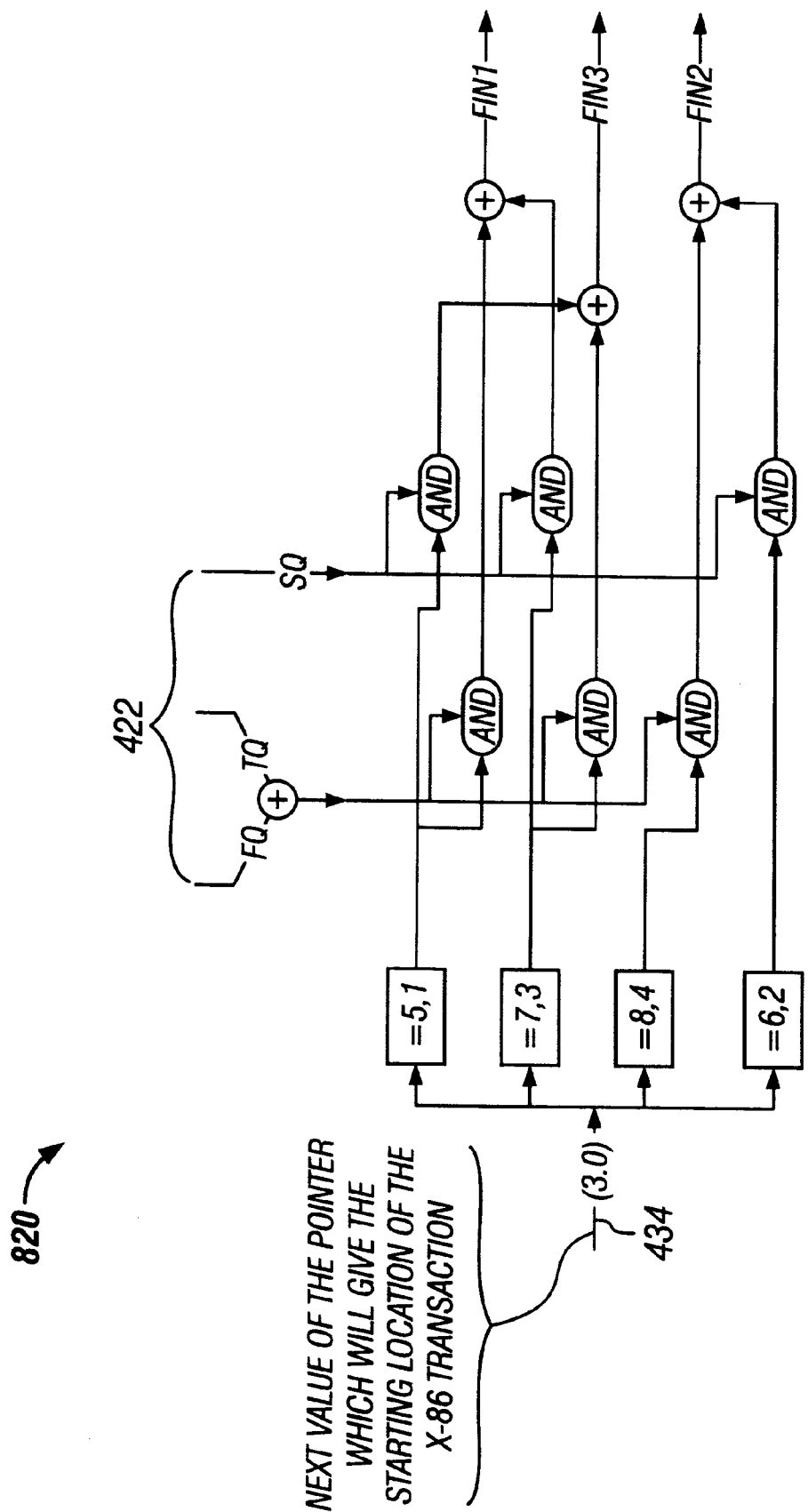

A select generation block 719 is used to generate the selection control signals for the multiplexers 718A through 718D and 717 that produce the virtual pointers. FIGS. 8A and 8B show one embodiment of the block 719 where "+" represents an "OR" logic, FQ, SQ, and TQ represent x86 orderings for X=01, 10, and 11, respectively, which are received on the bus 422 from the top of the token queue 420 in FIG. 4. FIG. 8A is a circuit 810 for generating the selection control signals for the multiplexers 718A through 718D. The number of remaining 4-byte double words are matched with the location of the pointer. Results are propagated through the diagonals adding new matches. Produced results are qualified with the x86 ordering of the cache line by the "AND" gates. FIG. 8B is a circuit 820 for generating the selection control signals for the multiplexer 717.

The circuit 460 in FIG. 7 is one embodiment of the reordering circuit 460 in FIG. 4. Four first-level multiplexers 721 through 724 are connected to the data buffer to pick the right dwords. Each first-level multiplexer is connected to receive double words from a set of locations separated by four locations from one another. Hence, each and every location can be accessed by the multiplexers 721 through 724. For example, the multiplexer 721 is connected to locations 0, 4, 8, etc. from the data queue 430. The four first-level virtual pointers from the multiplexers 718A through 718D respectively control the operations of the first-level multiplexers 721 through 724.

The circuit 460 also includes four second-level multiplexers 725 through 728 that place the selected double words from the first-level multiplexers 721 through 724 into correct segments of the AGP bus for transmission. The second-level virtual pointer from the multiplexer 717 controls operations of all second-level multiplexers 725 through 728.

Different output channels of the multiplexers 725 through 728 are used for different transfer speeds of the AGP bus. At the 1X mode, only the segment of the data bus from the multiplexer 725 is used. At the 2X mode, the segments of the data bus from multiplexer 725 and 726 are used. At the 4X mode, all four segments of the data bus are used.

Figure 9A:
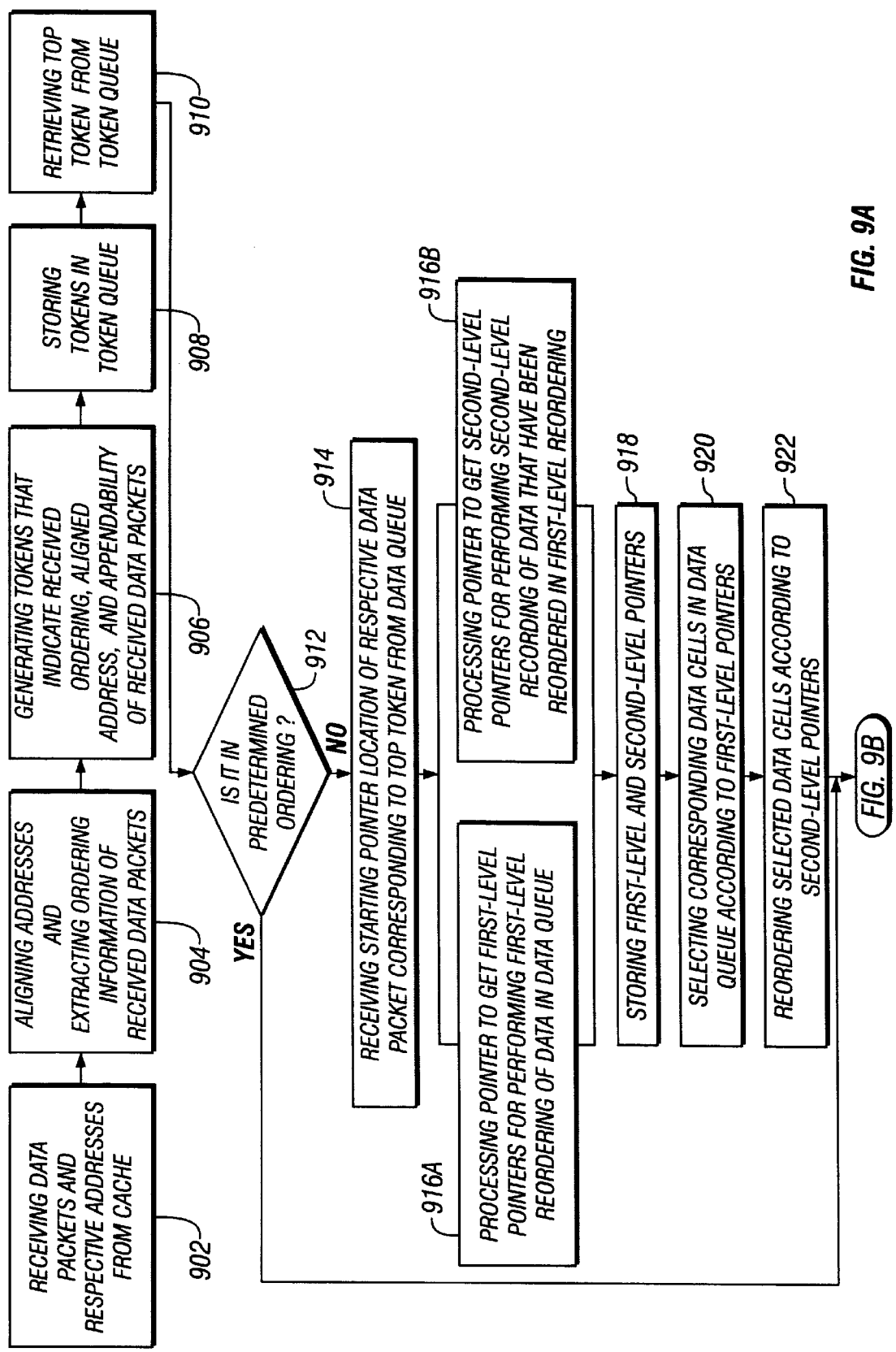
FIGS. 9A and 9B is a flowchart illustrating one implementation of the method shown in FIG. 3.
Figure 9B:
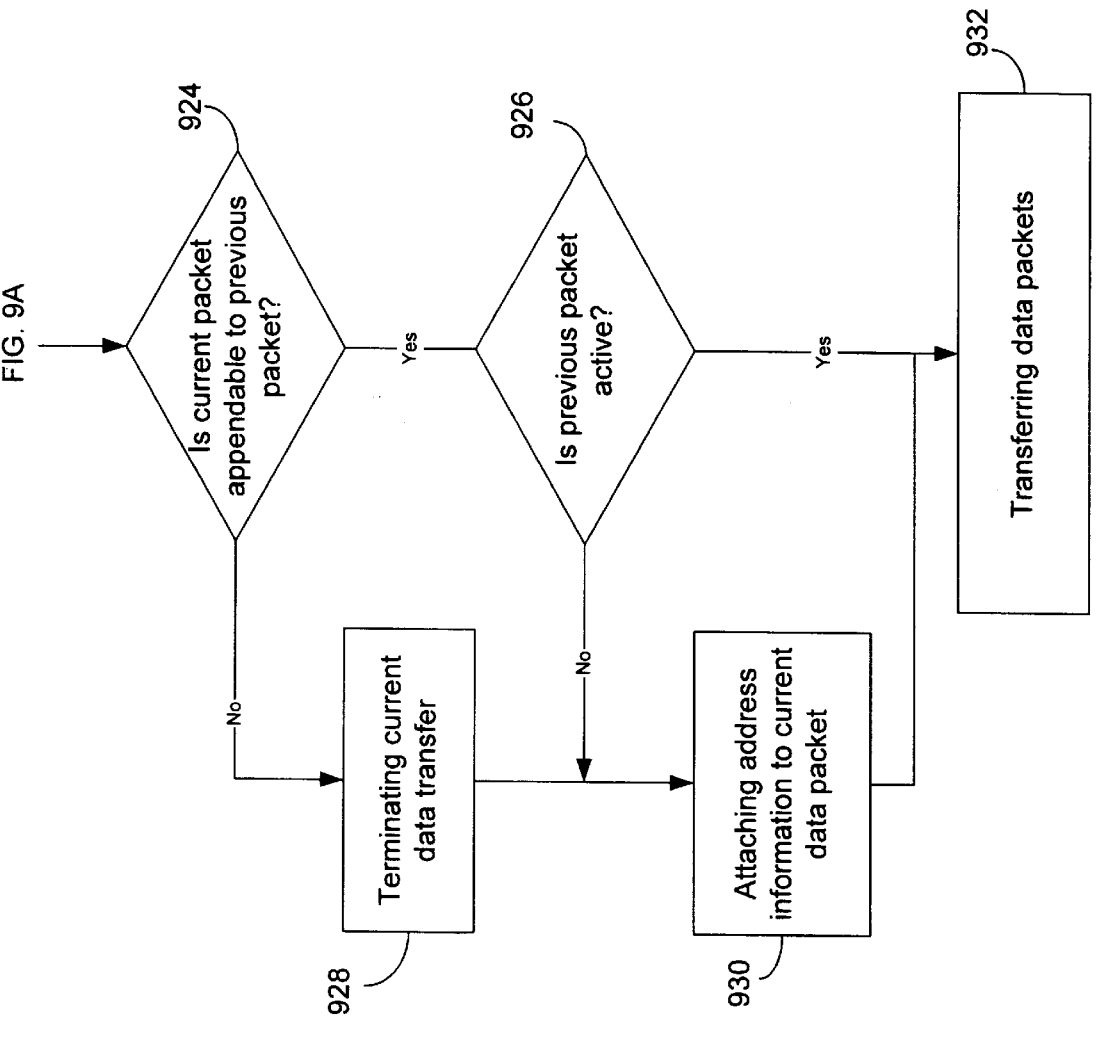

The reordering stage 402 of the circuit 400 is coupled to a bus control logic 480 and a transfer control circuit 490 for transmitting the reordered data packets. The bus control logic 480 receives the tag Y and the address for qword0 for a packet from the buffer 440 to determine if the current packet is appendable. If Y indicates that the packet is appendable, the transfer circuit 490 continuously transfers the received data packets without inserting address data. If Y indicates that the packet is not appendable, the transfer circuit 490 inserts a respective address between the previous data packet and the current data packet. In this case, only one address is needed for a packet because qwords in each data packet received by the transfer circuit 490 are in the linear ordering. This mode of data transfer provides more efficient use of the bus than inserting an address between two consecutive qwords in the PCI transfer. Operations of the circuits shown in FIGS. 4 through 8B are illustrated in the flowchart 900 shown in FIGS. 9A and 9B.

Although the present invention has been described in detail with reference to data transfer from the processor to the graphic controller on the AGP bus, Intel's AGP architecture is only an example of the increased clock speeds and improved microprocessor architectures to which the x86 ordering is a limiting factor. The described reordering mechanism of the x86 ordering may be applicable to data transfer on other buses to other devices on the chipset platforms. In addition, the first stage 401 in the circuit 400 of FIG. 4 may be coupled to a memory unit that is separate from the processor (e.g., L2 cache, a front-side or back-side cache in some computers). Furthermore, the reordering mechanism and the respective chipset may be built in to a processor. Hence, various modifications and enhancements may be made.

What is claimed is:

1. An apparatus for controlling data transfer from a storage device, comprising:
    a first circuit to receive data and process address information associated with the data addresses in the storage device to determine a received data ordering of the data based on data addresses in the storage device; and
    a second circuit to reorder the data into ordered packets each in a predetermined ordering without changing the address information.

2. An apparatus as in claim 1, wherein said first circuit includes a token generator to receive and process the address information of the data to generate tokens corresponding to consecutive data packets, each token indicating at least the received data ordering and addresses of data in a respective packet.

3. An apparatus as in claim 2, further comprising a queue stage having a token queue and a data queue to respectively receive and store the tokens and the data from said first circuit, wherein said first and second circuits form a pipeline through said queue stage.

4. An apparatus as in claim 3, wherein said second circuit includes:
    a processing unit to process the tokens and data address information in said data queue and to generate control signals for reordering the data in each packet;

a token buffer to receive one token from said token queue; and a reordering unit coupled to said processing unit and said buffer and configured to reorder the data in each data packet in the predetermined ordering, wherein said processing unit and said reordering unit form a pipeline to begin processing a token for one data packet while reordering of a preceding data packet is completing.

5. An apparatus as in claim 1, wherein the predetermined ordering is a linear ordering that corresponds to sequential addresses of the data in the storage device.

6. An apparatus as in claim 1, wherein said second circuit is coupled to output the ordered packets to a graphic controller through an accelerated graphic port.

7. A method for transferring data received from a storage device to a device in a computer, comprising:

processing address information associated with the data addresses in the storage device to determine a received data ordering of the data based on data addresses in the storage device; and reordering the data into ordered packets each in a predetermined ordering without changing the address information.

8. A method as in claim 7, wherein the predetermined ordering is a linear ordering that corresponds to sequential addresses of the data in the storage device.

9. A method as in claim 7, further comprising sending the ordered packets to a graphic controller through an accelerated graphic port.

10. An apparatus for controlling data transfer from a storage device to a receiving device, comprising:

a token-generating circuit to receive data packets and associated address information and to process the address information about data addresses in the storage device to generate tokens each indicative of an initial data ordering based on data addresses in the storage device and addresses of data in each packet;

a queue circuit having a token queue and a data queue to respectively receive the tokens and data packets from said token-generating circuit; and a reordering circuit coupled to said queue circuit to reorder the data in each packet based on the respective token into a predetermined ordering for transmission to the receiving device without changing the address information.

11. An apparatus as in claim 10, wherein the predetermined ordering is a linear ordering that corresponds to sequential addresses of the data in each packet in the storage device.

12. An apparatus as in claim 10, wherein the receiving device is a graphic controller coupled on an accelerated graphic port.

13. An apparatus as in claim 10, wherein said reordering circuit includes:

a processing unit to process the tokens and data address information in said data queue to generate control signals for reordering the data in each packet;

a token buffer to receive one token from said token queue; and a reordering unit coupled to said processing unit and said buffer and configured to reorder the data in each data packet into the predetermined ordering in response to the control signals.

14. An apparatus as in claim 13, wherein said processing unit and said reordering unit are coupled to form a pipeline to begin processing a token for one data packet while reordering of a preceding data packet is completing.

15. An apparatus as in claim 13, wherein said token-generating circuit comprises a token generator which includes:

an alignment block to receive and process the address information of each data packet from the storage device to generate a first tag indicative of the initial data ordering and an address of a first datum in the data packet in a linear ordering that corresponds to sequential addresses of datums of the packet in the storage device;

a comparator configured to compare the address of the first datum in the linear ordering in the data packet to an address of a first datum in the linear ordering of a preceding data packet to produce a second tag indicative of a relative location of the two data packets in the storage device; and a token assembler coupled to said alignment block and said comparator to produce a token for the data packet that includes the first and second tags and the address of the first datum in the linear ordering.

16. An apparatus as in claim 15, wherein said token generator includes a temporary token holder to receive and store an output token from said token assembler and to provide a stored token to said comparator.

17. An apparatus as in claim 13, wherein said reordering unit includes:

a plurality of first-level multiplexers, each having multiple inputs coupled to selected buffer cells of said data queue to select one datum from selected buffer cells as one first-level output signal in response to one of said control signals, said first-level multiplexers coupled to select a plurality of consecutive datums from said data queue; and a plurality of second-level multiplexers each having a plurality of inputs to respectively receive the first-level output signals, said second-level multiplexers configured to rearrange said datums in the first-level output signals in response to one of said control signals into the predetermined ordering.

18. An apparatus as in claim 13, wherein said processing unit includes a control-generating circuit to generate the control signals and a buffer to store the control signals, wherein said buffer is coupled between said control-generating circuit and said reordering unit to increase a throughput of the data transfer from the storage device to the receiving device.

19. A method for transferring data from a storage device to a receiving device in a computer, comprising:

determining a received data ordering of the data based on data addresses in the storage device;

reordering the data in packets of a predetermined ordering without changing address information associated with the data addresses in the storage device when the data is not in the predetermined ordering;

forming a message to include the data packets of the predetermined ordering, the message excluding address data associated with at least one of said data packets; and transferring the message to the receiving device.

20. A method as in claim 19, further comprising processing the address information to generate tokens each indicative of at least received data ordering of the data and addresses of the data in the storage device.

21. A method as in claim 19, further comprising:

transferring data in the two consecutive data packets continuously, without inserting address information between the transferred data when two consecutive data packets are continuously located in the storage device.

22. A method for transferring data from a storage device to a receiving device in a computer, comprising:

processing address information associated with the data addresses in the storage device to generate tokens each indicative of an initial data ordering of each packet sent out from the storage device based on data addresses in the storage device and addresses of data of each packet in the storage device;

reordering data in each packet into a predetermined ordering without changing the address information; and transferring each data packet to the receiving device in the predetermined ordering without inserting an address data segment between two datums in each packet.

23. A method as in claim 22, wherein the predetermined ordering is a linear ordering that corresponds to the sequential addresses of the data in each packet in the storage device.

24. A method as in claim 22, wherein the address information of the data packets is further processed to determine whether two sequentially received data packets are sequentially located in the storage device, and the method further comprising:

transferring datums in two data packets each in the predetermined ordering continuously one after another to the receiving device, without inserting packet address information between the two data packets during the transmission when the two data packets are sequentially located in the storage device; and inserting packet address information of a later received data packet of the two data packets between the two data packets during transmission when the two data packets are not sequentially located in the storage device.

25. A method as in claim 22, further comprising overlapping the step of generating a token for one data packet and the step of reordering another data packet immediately preceding the one data packet in time so as to increase a throughput of the data transfer from the storage device to the receiving device.

* * * * *